United States Patent Office 3,830,932
Patented Aug. 20, 1974

3,830,932
METHODS AND NITRO-BENZAMIDE COMPOSITIONS FOR PRODUCING TRANQUILIZING AND HYPOTENSIVE ACTIVITY
William D. Roll, Toledo, Ohio, assignor to The University of Toledo, Toledo, Ohio
No Drawing. Continuation-in-part of application Ser. No. 137,674, Apr. 26, 1971, now Patent No. 3,751,464. This application Aug. 6, 1973, Ser. No. 386,046
Int. Cl. A61u 27/00
U.S. Cl. 424—324        28 Claims

ABSTRACT OF THE DISCLOSURE

Simultaneously acting tranquilizing and/or hypotensive pharmaceutical compositions comprising effective amounts of compounds of the formula:

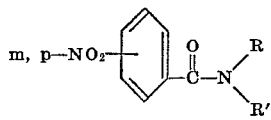

wherein R is selected from the group consisting of alkyl, hydroxyalkyl, cyanoalkyl, aryl, aralkyl, and hydroxyaralkyl radicals; and wherein R' is selected from the group consisting of cycloaliphatic radicals containing between three and seven carbon atoms.

RELATED APPLICATION

This application is a continuation-in-part of William D. Roll copending application Ser. No. 137,674 filed Apr. 26, 1971, now U.S. Pat. No. 3,751,464 issued Aug. 7, 1973.

BACKGROUND OF THE INVENTION

Although similar N, N'-substituted-nitrobenzamides are known, none were found which had any tranquilizing or blood pressure depressor effects as applicant's new compounds. For example; the Walde U.S. Pat. No. 3,015,606 patented Jan. 2, 1962, Welch et al. U.S. Pat. No. 3,518,305 patented June 30, 1970, and British Pat. No. 866,516 are for anti-protozoan activity; Soloway et al. U.S. Pat No. 3,530,181 patented Sept. 22, 1970 is for a herbicide; and Cope U.S. Pat. No. 2,442,797 patented June 8, 1948 for anesthetics which cause a complete desensitization type of action as distinguished from tranquilizers which do not cause complete desensitization.

SUMMARY OF THE INVENTION

This invention comprises pharmaceutical compositions containing various nitro-benzamides having novel tranquilizer and hypotensive activity and methods of administering these compositions to small animals, particularly to host animals having anxiety, tension, or psycho-pharmacological disturbances, and high blood pressure to produce these effects.

The compositions of this invention are unit dosage forms, such as tablet, capsule, elixir, sterile solution, suspension, etc., containing a therapeutically effective amount of a nitro-benzamide having the general formula:

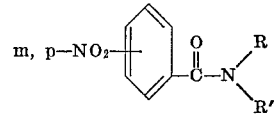

wherein R may comprise methyl-, ethyl-, propyl-, isopropyl, hydroxymethyl-, 2-hydroxyethyl-, 2-cyanoethyl-, phenyl, 2-phenethyl-, 2-hydroxyphenethyl-, and R' may comprise a tri-, quatra-, penta-, hexa-, or hepta-cycloaliphatic radical, preferably the cyclohexyl radical, which together with the nitro-radical on the phenyl ring of the benzamide confers the proper physicochemical properties on these compounds which are necessary for maximal activity in the animals tested. Although the para-nitro-substituted compounds are preferred, the meta-nitro-substituted compounds also are good. The N-small alkyl ($C_1$ to $C_3$) substituted compounds showed the most significant depressant and blood pressure depressor action in any practical dosages. From this generic group of compounds there may be divided several subgroups, such as the para-nitro benzamides which showed the most reduction in spontaneous activity in mice, namely, those having the methyl, ethyl, isopropyl, 2-hydroyethyl, cyanoethyl, and/or phenyl radicals and the ones of this sub-group which have the most hypotensive activity in normo-tensive rats are the ones having the methyl, ethyl, isopropyl, and 2-hydroxyethyl radicals. The sub-group of meta nitro-benzamides which showed the most reduction in spontaneous activity in mice are those having methyl, 2-hydroxyethyl, phenyl, and 2-hydroxyphenethyl radicals. Still another sub-group may include both the para and meta nitro-benzamides having the most reduction in spontaneous activity in mice which contain the methyl, 2-hydroxyethyl, and phenyl radicals.

The new compounds according to this invention were prepared by the following equation:

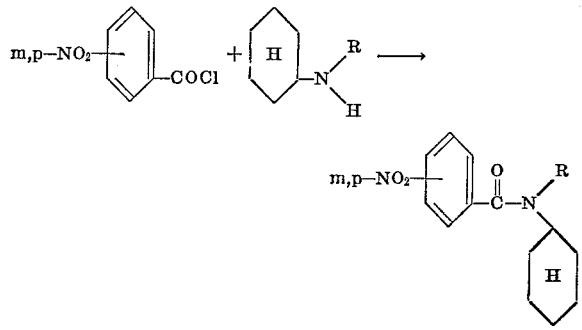

Herein equimolar amounts of the nitrobenzoyl halide were reacted with a well stirred solution of N-substituted-cycloalkylamine in triethylamine and dimethylacetamide at a temperature between about 0° and 10° C. When the addition of the nitrobenzoyl halide solution was completed, the crude substituted benzamide was precipitated by the addition of cold water and collected. This crude product was crystallized from aqueous ethanol to give the pure new compounds of this invention, which were tested for composition and physical properties. The results of some of these tests on the preferred N-substituted-N'-cyclohexyl- m, p-nitrobenzamides are shown in the following Table I:

TABLE I.—SUBSTITUTED NITROBENZAMIDES

| Ex. No. | NO₂ position | N—R | Yield, percent | M.P., °C. | Calculated C | Calculated H | Found C | Found H |
|---|---|---|---|---|---|---|---|---|
| 1 | p- | —CH₃ | 76.5 | 102.5 | 64.11 | 6.92 | 64.40 | 6.95 |
| 2 | m- | —CH₃ | 72.2 | 94.5 | 64.11 | 6.92 | 64.35 | 6.91 |
| 3 | p- | —C₂H₅ | 70.5 | 72.3 | 65.44 | 6.96 | 65.40 | 6.97 |
| 4 | m- | —C₂H₅ | 72.3 | 45.0 | 65.44 | 6.96 | 65.46 | 6.94 |
| 5 | p- | —CH(CH₃)₂ | 69.5 | 107.8 | 66.18 | 7.64 | 65.99 | 7.67 |
| 6 | m- | —CH(CH₃)₂ | 74.8 | 35.6 | 66.18 | 7.64 | 66.10 | 7.61 |
| 7 | p- | —CH₂CH₂—OH | 75.0 | 210.5 | 61.63 | 6.90 | 61.59 | 6.93 |
| 8 | m- | —CH₂CH₂—OH | 74.2 | ᵃ Oil | 61.63 | 6.90 | 61.66 | 6.91 |
| 9 | p- | —CH₂CH₂—CN | 72.5 | 120.1 | 63.77 | 6.35 | 63.82 | 6.30 |
| 10 | m- | —CH₂CH₂—CN | 69.6 | 93.1 | 63.77 | 6.35 | 63.90 | 6.38 |
| 11 | p- | —C₆H₅ | 71.3 | 132.4 | 70.37 | 6.21 | 70.39 | 6.20 |
| 12 | m- | —C₆H₅ | 75.0 | 105.1 | 70.37 | 6.21 | 70.31 | 6.19 |
| 13 | p- | —CH₂—CH—OH | 65.8 | 126.1 | 68.46 | 6.57 | 68.40 | 6.55 |
| 14 | m- | —CH₂—CH—OH | 66.9 | 25.2 | 68.46 | 6.57 | 68.55 | 6.60 |

ᵃ Purified by chromatography (eluted by petroleum ether) on silica gel.

The activity of these nitro-benzamide compounds was tested by dissolving them in propylene glycol and administering their resulting solutions orally and parenterally into small animals such as rats and mice in dosages of one, three, five and seven milligrams per kilogram of weight of the animal administered. The tranquilizing effect of the new compounds was determined in C3H mice weighing between 20 and 25 grams with actophotomers, which measure the total movements of a single animal each fifteen minute interval over a one hour period. The mean count for each period of eight animals for each compound was recorded. Eight additional mice were administered the same amounts of chlorpromazine, a well known tranquilizer, and the results obtained are listed in the following table which shows most of these new compounds to be more active than chlorpromazine at least in some dosages, and usually the substituted para-nitrobenzamides to be the most active.

TABLE II.—EFFECTS ON THE SPONTANEOUS ACTIVITY IN MICE

| Cpd. No. | Dose, mg./kg. | Percent reduction in spontaneous activity | Cpd. No. | Dose, mg./kg. | Percent reduction in spontaneous activity |
|---|---|---|---|---|---|
| Chlorpromazine | 1.0 | 2.5 | 7 | 5.0 | 89.6 |
|  | 3.0 | 42.4 |  | 7.0 |  |
|  | 5.0 | 60.0 | 8 | 1.0 | 18.5 |
|  | 7.0 | 75.2 |  | 3.0 | 57.6 |
| 1 | 1.0 | 32.4 |  | 5.0 | 75.8 |
|  | 3.0 | 72.0 |  | 7.0 | 90.4 |
|  | 5.0 | 91.1 | 9 | 1.0 | 18.5 |
|  | 7.0 |  |  | 3.0 | 58.4 |
| 2 | 1.0 | 23.1 |  | 5.0 | 76.0 |
|  | 3.0 | 62.9 |  | 7.0 | 91.0 |
|  | 5.0 | 80.4 | 10 | 1.0 | 6.0 |
|  | 7.0 | 95.2 |  | 3.0 | 45.2 |
| 3 | 1.0 | 30.3 |  | 5.0 | 63.1 |
|  | 3.0 | 66.4 |  | 7.0 | 76.8 |
|  | 5.0 | 86.0 | 11 | 1.0 | 18.8 |
|  | 7.0 |  |  | 3.0 | 58.1 |
| 4 | 1.0 | 4.5 |  | 5.0 | 76.5 |
|  | 3.0 | 44.1 |  | 7.0 | 90.0 |
|  | 5.0 | 61.9 | 12 | 1.0 | 20.2 |
|  | 7.0 | 76.5 |  | 3.0 | 60.0 |
| 5 | 1.0 | 32.0 |  | 5.0 | 77.4 |
|  | 3.0 | 73.9 |  | 7.0 | 92.5 |
|  | 5.0 | 93.4 | 13 | 1.0 |  |
|  | 7.0 |  |  | 3.0 | 36.1 |
| 6 | 1.0 | 0.5 |  | 5.0 | 54.2 |
|  | 3.0 | 39.0 |  | 7.0 | 69.0 |
|  | 5.0 | 57.2 | 14 | 1.0 | 23.8 |
|  | 7.0 | 72.0 |  | 3.0 | 63.4 |
| 7 | 1.0 | 32.5 |  | 5.0 | 80.4 |
|  | 3.0 | 71.8 |  | 7.0 | 95.2 |

Indirect blood pressure measurements were conducted in normotensive Wistar rats by injecting 5 mg./kg. intraperitoneally, and the systolic blood pressure was determined by using a photoelectric tensometer. The mean response of eight test animals and eight control animals was used to determine the percent reduction in blood pressure produced by each tested compound. The results of these pharmacological tests for compounds 1, 3, 5 and 7 listed in Table I above are shown in the following Table III:

TABLE III.—HYPOTENSIVE ACTIVITY IN NORMOTENSIVE RATS

| Compound number | Percent of control blood pressure (minimum following administration) | | | | |
|---|---|---|---|---|---|
|  | (15) | (30) | (60) | (90) | (120) |
| 1 | 50.0 | 28.6 | 20.5 | 15.0 | 0.0 |
| 3 | 49.4 | 32.0 | 22.6 | 14.2 | 2.5 |
| 5 | 50.4 | 31.6 | 20.8 | 12.5 | 3.1 |
| 7 | 48.3 | 30.2 | 20.0 | 5.1 | 0.0 |

The pharmaceutical compositions of this invention are composed of these nitro-benzamides incorporated in a non-toxic liquid or solid pharmaceutical carrier or excipient. Thus, simple propylene glycol solutions of the active ingredients have been found suitable, however, the active ingredients may be incorporated in pharmaceutical carrier forms, such as tablets or capsules, which may contain other non-toxic materials such as fillers or diluents, namely: lactose or sucrose, and may contain a binding agent such as glucose, gum acacia, gelatin, starch paste, etc. Furthermore, they may contain lubricants, such as magnesium stearate, talc, etc., as well as such disintegrating agents as corn starch, microcrystalline cellulose, etc. The active ingredients may also be incorporated into injectable solutions which may contain other non-toxic materials including: solvents, such as propylene glycol, water for injection, etc., and preservatives, such as benzyl alcohol, etc.

The unit dosage forms are prepared by standard formulation methods such as by granulating and tableting, by mixing with a carrier and filling into hard capsules; by dissolving or suspending in a suitable sterile parenteral vehicle; or by dissolving in an aqueous vehicle for an oral liquid dosage form.

The unit dosage forms will contain a sufficient amount of active ingredient to provide effective tranquilizing and/or hypotensive activity with corresponding minimal toxic side effects.

A unit dose range of from approximately 10–150 mg. provides tranquilizing and/or hypotensive activity with minimal side reactions. Such unit doses are administered 1–4 times daily. For calculating the amounts of active ingredients in the claimed unit dosage forms, it is often convenient to use milligrams of the active compounds per kilogram of the weight of the animal to which they are administered, depending on the activity of the active ingredient together with the size and pharmacology of the host animal. In such claimed unit dosages, the active compound will be present in approximately 0.5–10 mg./kg. but preferably 1–7 mg./kg. amounts.

DETAILED DESCRIPTION OF SOME PREFERRED EMBODIMENTS

The following examples are designed to explain the methods of preparation and administration of the compounds of this invention, but it is to be understood that they are not to limit the scope of this invention.

Example 1

N-methyl-N'-cyclohexyl-p-nitrobenzamide was prepared by adding a mixture of 25 milliliters of dimethylacetamide, 0.01 mole of p-nitrobenzoyl chloride to a cooled solution (ice bath) containing 0.01 mole of N-methylcyclohexylamine, 25 milliliters of dimethylacetamide and 0.01 mole of triethylamine. When the addition of the p-nitrobenzoyl chloride solution was completed the crude N-methyl-N'-cyclohexyl - p - nitrobenzamide was precipitated by the addition of cold water and collected. This crude product was recrystallized from aqueous ethanol to form the pure nitrobenzamide of this Example.

This new compound was then tested according to the Table I above in which the carbon and hydrogen content were obtained with a Coleman Carbon-Hydrogen analyzer. The melting point was determined by using a Mettler FP-1 melting and boiling point apparatus. The infrared absorption spectrum was obtained with a Perkin-Elmer Model 137-B spectrophotometer.

The oral administration of one, three, five and seven milligrams per kilogram of this compound dissolved in propylene glycol resulted in a significant reduction in the spontaneous motor activity of the mice (see Table II above), and also a reduction in the blood pressure (see Table III above).

Example 2

N-methyl-N'-cyclohexyl - m - nitrobenzamide was prepared from m-nitrobenzoyl chloride and N-methylcyclohexylamine in the same manner as that employed in Example I above. The resulting compound was also tested as described in Example 1 above, and as shown in Tables I, II above.

Example 3

N-ethyl-N'-cyclohexyl-p-nitrobenzamide also was produced in the same manner described in Example 1 above. This new compound was similarly tested as described above and as shown in Tables I, II, and III. It was shown to have both tranquilizing and blood pressure depressor activity in dosages of 5 mg./kg. and its blood pressure activity had a relative long duration.

Example 4

N - ethyl - N' - cyclohexyl-m-nitrobenzamide was also produced according to the process described for Example 1 above and similarly tested as shown in Tables I and II. Intraperitoneal doses of this compound of five milligrams per kilogram in propylene glycol produced a high degree of tranquilizing activity as shown in Table II.

Example 5

N - isopropyl - N' - cyclohexyl-p-nitrobenzamide was produced similar to the process described in Example 3, and it had pharmocological effects similar to those for the compound of Example 3 as shown in Tables II and III. This compound had the greatest tranquilizing action, and its blood pressure depressor action had the fastest onset.

Example 6

N - isopropyl - N' - cyclohexyl-m-nitrobenzamide was produced according to the process described for Example I above and simlarly tested as shown in Tables I and II. 1 and was tested to have tranquilizing properties about

Example 7

N - 2 - hydroxyethyl - N' - cyclohexyl-p-nitrobenzamide was produced according to the process described for Example 1 and was tested to have properties as shown in Tables I, II and III.

Example 8

N - 2 - hydroxyethyl - N' - cyclohexyl - m - nitrobenzamide was produced according to the process described for Example 1 and was tested to have properties as shown in Tables I and II.

Example 9

N - 2 - cyanoethyl - N' cyclohexyl-p-nitrobenzamide was produced according to the process described for Example 1 and was tested to have properties as shown in Tables I and II.

Example 10

N - 2 - cyanoethyl - N' - cyclohexyl-m-nitrobenzamide was produced according to the process described for Example 1 and was tested to have properties as shown in Tables I and II.

Example 11

N - phenyl - N' cyclohexyl-p-nitrobenzamide was produced according to the process described for Example 1 and was tested to have properties as shown in Tables I and II.

Example 12

N - phenyl - N' cyclohexyl-m-nitrobenzamide was produced according to the process described for Example 1 and was tested to have properties as shown in Tables I and II.

Example 13

N - 2 - hydroxyphenethyl - N' - cyclohexyl-p-nitrobenzamide was produced according to the process described for Example 1 and was tested to have properties as shown in Tables I and II.

Example 14

N - 2 - hydroxyphenethyl - N' - cyclohexyl-m-nitrobenzamide was produced according to the process described for Example 1 and was tested to have properties as shown in Tables I and II.

Example 14

N - 2 - hydroxyphenethyl - N' - cyclohexyl-m-nitrobenzamide was produced according to the process described for Example 1 and was tested to have properties as shown in Tables I and II.

Example 15

Tablet formulation: Gm./tablet
- Active ingredient _____ 0.025
- Lactose _____ 0.150
- Sucrose _____ 0.025
- Corn starch _____ 0.015
- Stearic acid _____ 0.003

These ingredients are granulated and compressed by standard pharmaceutical methods.

Example 16

Capsule formulation: Gm./capsule
- Active Ingredient _____ 0.025
- Magnesium Stearate _____ 0.002
- Lactose, q.s. ad _____ 0.300

These ingredients are screened, mixed and filled into hard gelatine capsules.

Example 17

Oral elixir formulation: Gm./capsule
- Active ingredient _____mg__ 400
- Aromatic elixir, USP, to make _____cc__ 1000

Example 18

Parenteral formulation: Percent
- Active Ingredient _____ 0.040
- Propylene glycol _____ 60.00
- Benzyl alcohol _____ 2.00
- Water for injection, USP, p.s. ad. _____ 100.00

I claim:
1. A method of producing a tranquilizing and hypotensive activity in a host animal needing such treatment, comprising administering internally to said host animal a non-toxic but effective quantity of a compound of the formula:

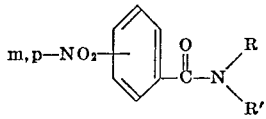

wherein R is selected from the group consisting of alkyl, having one, two and three carbon atoms, 2-hydroxyethyl, phenyl, and 2-hydroxyphenethyl, and wherein R' is cycloalkyl containing between three and seven carbon atoms.

2. A method according to claim 1 wherein the nitro is located in the meta-position of the phenyl ring.
3. A method according to claim 1 wherein the nitro is located in the para-position of the phenyl ring.
4. A method according to claim 1 wherein said R' is cyclohexyl.
5. A method according to claim 1 wherein R is methyl.
6. A method according to claim 1 wherein R is ethyl.
7. A method according to claim 1 wherein R is isopropyl.
8. A method according to claim 1 wherein R is 2-hydroxyethyl.
9. A method according to claim 1 wherein R is phenyl.
10. A method according to claim 1 wherein R is 2-hydroxyphenethyl.
11. A method according to claim 1 wherein said compound is N-cyclohexyl-N-methyl-p-nitrobenzamide.
12. A method according to claim 1 wherein said compound is N-cyclohexyl-N-methyl-m-nitrobenzamide.
13. A method according to claim 1 wherein said compound is N-cyclohexyl-N-ethyl-p-nitrobenzamide.
14. A method according to claim 1 wherein said compound is N-cyclohexyl-N-isopropyl-p-nitrobenzamide.
15. A method according to claim 1 wherein said compound is N - cyclohexyl - N - 2 - hydroxyethyl-p-nitrobenzamide.
16. A method according to claim 1 wherein said compound is N-cyclohexyl - N - 2 - hydroxyethyl-m-nitrobenzamide.
17. A method according to claim 1 wherein said compound is N-cyclohexyl-N-phenyl-p-nitrobenzamide.
18. A method according to claim 1 wherein said compound is N-cyclohexyl-N-phenyl-m-nitrobenzamide.
19. A method according to claim 1 wherein said compound is N-cyclohexyl - N - 2-hydroxyphenethyl-m-nitrobenzamide.
20. A method according to claim 1 wherein the quantity of said compound administered is between about 0.5 and 10 milligrams per kilogram of the host animal.
21. A method according to claim 1 wherein the quantity of said compound administered is between about 1 and 7 milligrams per kilogram of the host animal.
22. A method according to claim 1 wherein said compound together with a pharmaceutically acceptable carrier is administered in a unit dose composition in the form of a capsule, tablet, elixir or parenteral formulation.
23. A tranquilizer and hypotensive pharmaceutical composition comprising an effective amount of compound of the formula:

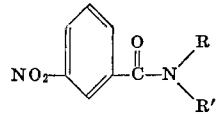

wherein R is selected from the group consisting of alkyl, having one, two and three carbon atoms, 2-hydroxyethyl, phenyl, and 2-hydroxyphenethyl, and wherein R' is selected from the group consisting of cycloalkyl containing between three and seven carbon atoms, together with a pharmaceutically acceptable carrier.

24. A composition according to claim 23 wherein R' is cyclohexyl.
25. A composition according to claim 23 wherein R is methyl.
26. A composition according to claim 23 wherein R is phenyl.
27. A composition according to claim 23 wherein R is 2-hydroxyethyl.
28. A composition according to claim 23 wherein said R is 2-hydroxyphenethyl.

References Cited

UNITED STATES PATENTS 2,442,797   6/1948   Cope _____ 260—477

FOREIGN PATENTS 1,520,925   3/1968   France _____ 260—465

OTHER REFERENCES

R. Kalischer et al., Chem. Abst., vol. 27, col. 998 (1933).

S. Winternitz et al., Chem. Abst., vol. 47, col. 12269 (1953).

T. Hancock et al., J. Amer. Chem. Soc., vol. 66, pp. 1738–47 (October 1944).

STANLEY J. FRIEDMAN, Primary Examiner

PO-1050
(5/69)

UNITED STATES PATENT OFFICE
CERTIFICATE OF CORRECTION

Patent No. 3,830,932           Dated August 20, 1974

Inventor(s) William D. ROLL

It is certified that error appears in the above-identified patent and that said Letters Patent are hereby corrected as shown below:

olumn 2, line 26, change "hydroyethyl" to - - hydroxyethyl - - ;
olumn 4, line 27, after "Percent" insert - - reduction - - ; Column 5, ne 28, cancel "I above and simlary tested as shown in Tables I and II.";
olumn 5, line 69, after "about" insert - - the same as chlorpromazine - -;
olumn 6, line 75, change "p." to - - q. - -

Signed and sealed this 31st day of December 1974.

(SEAL)
Attest:

McCOY M. GIBSON JR.           C. MARSHALL DANN
Attesting Officer               Commissioner of Patents